United States Patent [19]

Cacoub

[11] Patent Number: 4,922,154
[45] Date of Patent: May 1, 1990

[54] CHROMATIC LIGHTING DISPLAY

[76] Inventor: Alain Cacoub, 94 Rue de Sevres, 75007 Paris, France

[21] Appl. No.: 142,015

[22] Filed: Jan. 11, 1988

[51] Int. Cl.$^5$ ............................................. H05B 37/02
[52] U.S. Cl. .................................... 315/149; 315/152; 315/153; 315/155; 315/312
[58] Field of Search .................... 315/10, 11, 149, 152, 315/153, 154, 155, 158, 159, 312

[56] References Cited

U.S. PATENT DOCUMENTS

| | | | |
|---|---|---|---|
| 3,500,455 | 3/1970 | Ross et al. | 315/149 |
| 4,308,456 | 12/1981 | Van Der Gaag et al. | 356/416 X |
| 4,334,782 | 6/1982 | Thornton, Jr. et al. | 356/406 |
| 4,386,345 | 5/1983 | Narveson et al. | 340/721 X |
| 4,485,336 | 11/1984 | Yoshiyama et al. | 315/241 P |
| 4,516,055 | 5/1985 | Nelson | 315/152 X |

*Primary Examiner*—David Mis
*Attorney, Agent, or Firm*—Robert D. Farkas

[57] ABSTRACT

A chromatic lighting display utilizes a plurality of light-producing elements positioned to be visually accessed by a user, the elements arranged in co-extensive and diverse positions, controlled in light-emitting intensities and colors by a centrally located control mechanism coupled thereto. A plurality of light sensors are disposed to receive natural external light, each adapted with suitable color filters. The signals generated by the light-receiving sensors are transmitted to the control device which, in turn, operating upon a predetermined color-responsive algorithm, provides energization to each of the plurality of light-emitting devices, providing the display of different colors of light, at different intensities, accessible to the user.

12 Claims, 6 Drawing Sheets

CHROMATIC LIGHTING DISPLAY

BACKGROUND OF THE INVENTION

1. The Field of the Invention

This invention concerns lighting displays, capable of emitting colored light at diverse locations, responsive to the intensity and color of the ambient light available at a remote location from the lighting display.

2. Description of the Prior Art

Lighted displays are well known. Amongst such displays are flashing lights, flashing in accordance with a predetermined program and each or groups of said lights being of different colors. Typical of such prior use are displays found on theater marquees, large signs, and the like.

Other lighting displays, well known in the prior art, comprise flashing or continuously lit devices containing light-emitting elements that are disposed in sequence along substantially parallel paths. By controlling the timing of energization of each of said paths of lights, the display will appear to change color in accordance with a preset, rapidly changing program, usually adapted to attract the user's attention.

Street lighting, as is well known in the prior art, is often controlled by either timers —adjusted to be responsive to seasonal changes in dusk and dawn times, or, photocells, exposed to the ambient light, such that the street lighting will automatically become energized when the ambient light falls below the preset levels. Such energization is characterized by applying full power to the lighting device during dark periods and no power at all during periods of sufficient ambient light.

None of the foregoing prior art discloses teach a device which is responsive to the intensity and color of ambient light, which in turn produces variable intensities and variable color lights in accordance with a preset program or algorithm, so as to create pleasing displays, automatically changing in color and intensity as the ambient light itself changes.

Accordingly, it is an object of the subject invention to provide a chromatic lighting display responsive to the color and intensity of ambient light.

It is another object of the subject invention to provide a lighting display which may be utilized in interior or exterior areas, or both, at preset time intervals and/or responsive to the presence and intensity of ambient light.

It is a further object of the subject invention to provide a lighting display which can produce visually accessible elements that are light reflective or light emitting in accordance with a preset algorithm responsive to the intensity and color of ambient light.

It is an additional object of the subject invention to provide adjustable timing devices that may control the time periods in which the chromatic lighting display is activated.

It is still an additional object of the subject invention to create a lighting display system having a range of colors and tones accessible to a visual user responsive to ambient lighting conditions and to a preset, timed color program which creates chromatic harmony with climatic lighting conditions.

SUMMARY OF THE INVENTION

The present invention surpasses the available prior art and it succeeds in accomplishing the objects set forth herein by providing a plurality of lighting sensors, each adapted with suitable color filters, exposed to the ambient light. Such lighting sensors produce an electrical signal, which in turn is analyzed in a control mechanism or device which produces output signals in accordance with a preset program. The output signals are then transmitted to a plurality of light-emitting or light-reflecting devices such that a variable colorable display, having a variable intensity, if desired, may be produced. The lighting display may be positioned on the exterior surface of buildings and other structures, as well as in specially created structures accessible outdoors to the visual user. In addition, lighting displays may be employed in the form of signs, along paths, or other locations outside of buildings. In addition, lighting displays may be employed at interior locations, such as signs, at locations associated with windows, furniture, and the like.

Timing devices may be employed which are responsive to preset timing intervals such that the periods of time in which the display device is energized or in operation is controlled. Alternate to same, or in combination with same, the overall ambient intensity of the exterior light may be used to turn on and off the power provided to the lighting display.

Typically, one or more housings are disposed in the exterior portion of a building, each housing having an opening capable of receiving ambient light. Within such housing are a plurality of light-receiving sensors, each adapted with suitable filtering elements. Such devices generate signals which are responsive to the colors passing through the filter and indicate the presence of ambient light in such color ranges, as well as its intensity. Upon comparing all of the outputs of each of the color sensors within a control mechanism, output signals are generated in accordance with predetermined, timed algorithms. The output signals are then transmitted to either light-reflective or light- emitting devices arranged in a display fashion in or about buildings, or on the open ground, so as to create a chromatic lighting display, whose intensity and colors and location are all controlled by the control mechanism. Thus, contrasting or coordinating color patterns may be generated at selected locations, from time to time, consistent with the varying ambient light to which the housing is exposed, at selected times. This creates a pleasing visual picture rather than a program that automatically varies light producing devices in a preset, fixed schedule. The present invention may, to the extent desired, change its visual aspect, from time to time, in accordance with a timing program as well.

DESCRIPTION OF EMBODIMENT OF THE INVENTION

Figure 1:
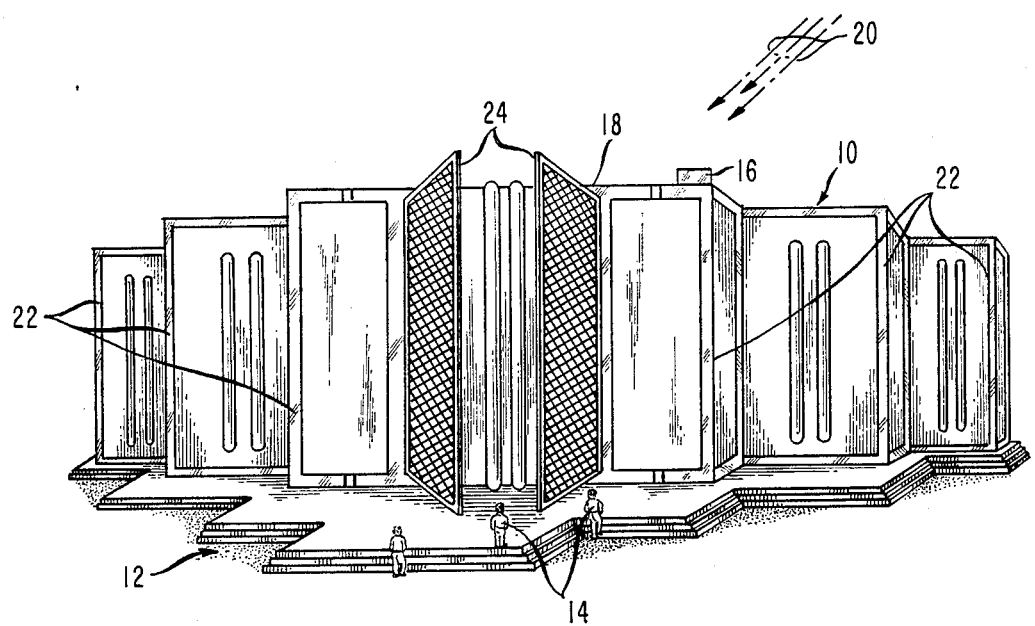
FIG. 1 is a perspective view of an outdoor structure, carrying lighting displays shown unilluminated.

FIG. 1 shows structure 10 disposed residing upon supporting surface 12, visually accessible to users 14. Housing 16, located on an exterior surface 18 of structure 10, is capable of receiving ambient light, shown by arrows 20 therein. Lines 22 and 24 are depicted on the exterior surface of structure 10 so as to be visually accessible to users 14. Such lines, as shown, are dormant and inactive, regarding the present invention. Such lines may, however, because of the apparatus's comprising same, to be later described, may have, if desired, diverse colors at various locations.

Figure 2:
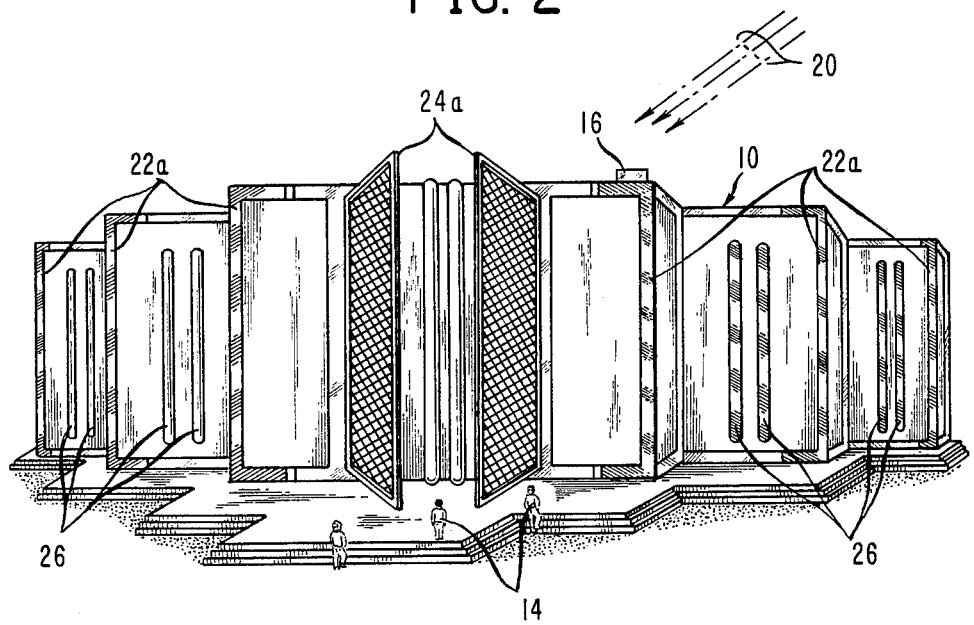
FIG. 2 is a perspective view of the apparatus described in FIG. 1, wherein portions of the structure are illuminated at diverse locations, as shown, in color and in intensity.

FIG. 2 represents structure 10 which, upon the activation of the present system, produces the effect that lines 22a and 24a now are illuminated, in a color responsive to light rays 20 entering housing 16. If desired, lines 26 become illuminated at the time that lines 22a and 24a become illuminated, contrasted with the fact that such lines do not have a noticeable appearance when the apparatus as shown in FIG. 1 is deactivated.

Figure 3:
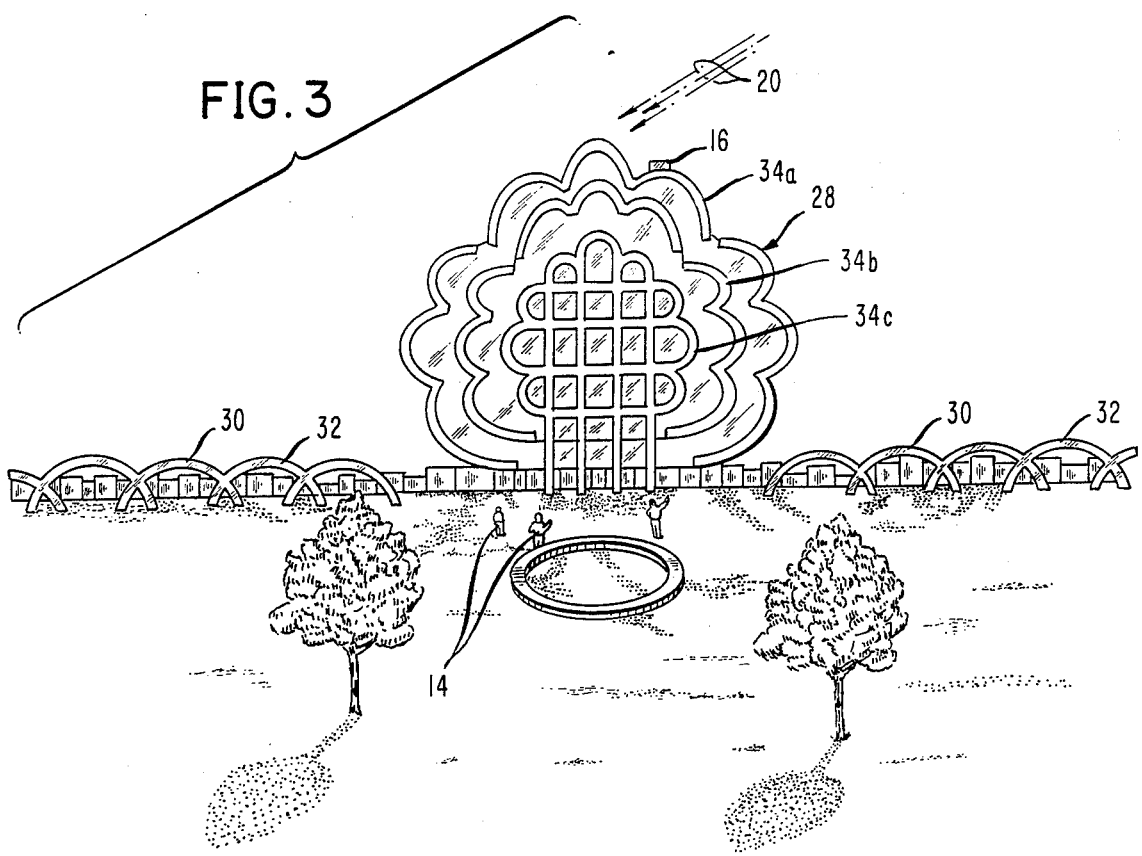
FIG. 3 is a perspective view of another embodiment of outdoor display, showing various portions thereof illuminated in color responsive to the ambient light.

FIG. 3 illustrates structure 28 and structures 30 carrying thereon illuminated lines 32 and 34a, 34b, and 34c; such lines being illustrated in a variety of colors consistent with the ambient light shown by arrows 20 introduced into housing 16, disposed on an exterior visually accessible portion of structure 28.

Figure 4:
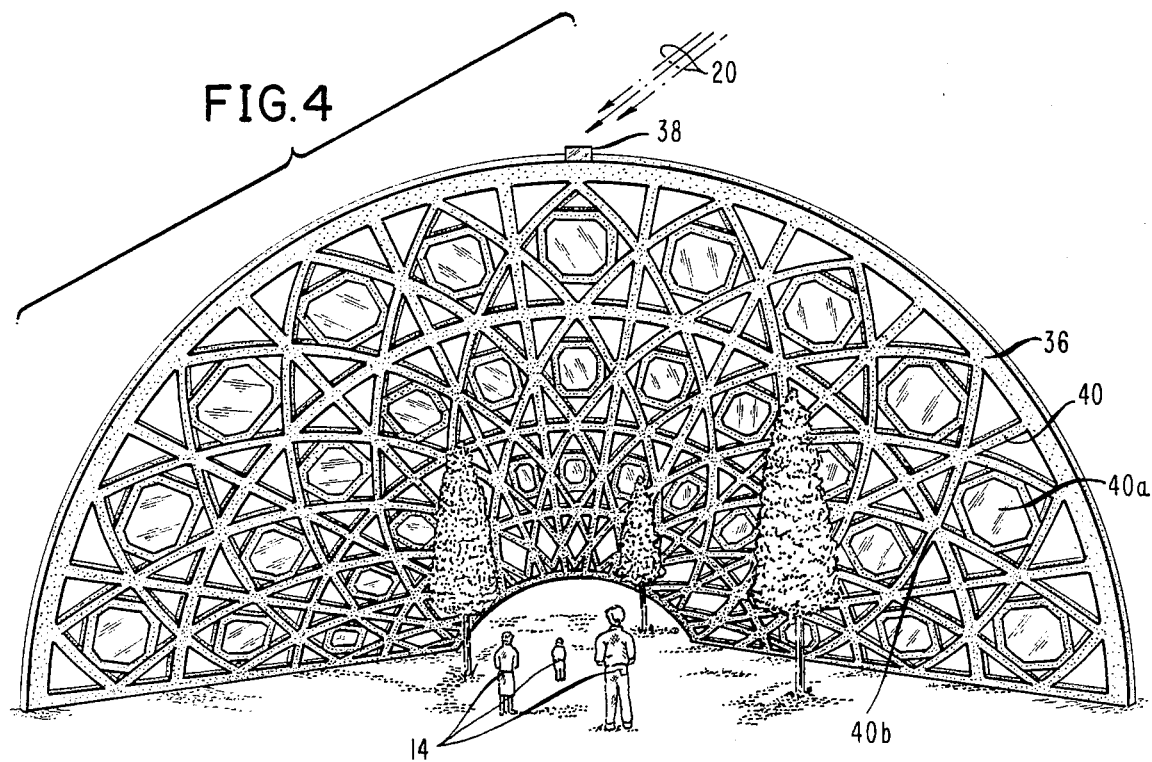
FIG. 4 is another outdoor display, showing various portions thereof illuminated in color responsive to the ambient light.

FIG. 4 illustrates structure 36 in the form of an outdoor display. Users 14 have visual access to the exterior surface of structure 36. Ambient light shown by arrows 20 enters housing 38 and offers such intensity and color to operate the mechanism, not shown, so as to cause lighting display elements 40, 40a, and 40b to become illuminated in a predesired color and intensity or to display colors at the locations of elements 40, 40a and 40b.

Figure 5:
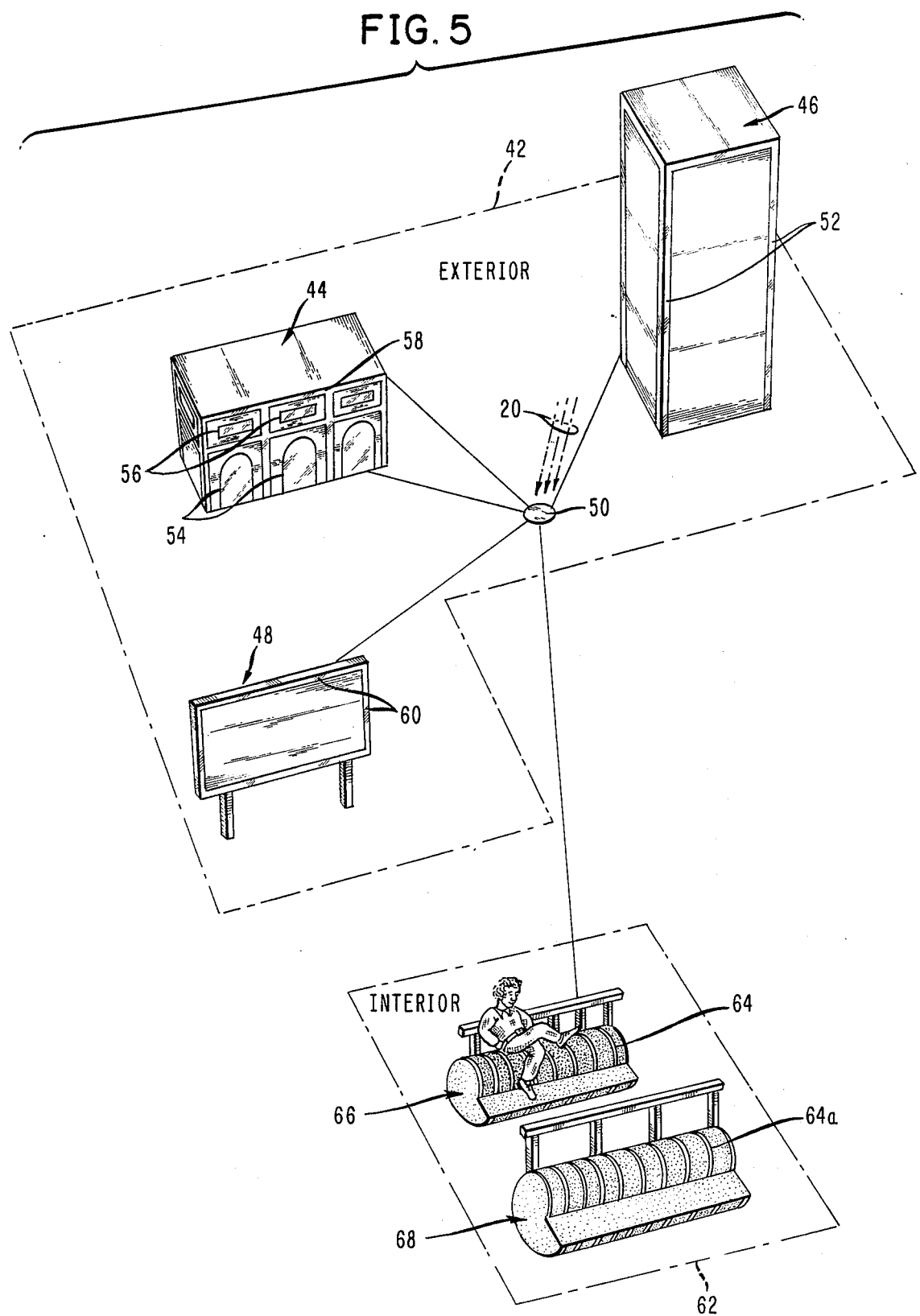
FIG. 5 is a plan view of an exterior and interior display of the various structures shown perspectively.

FIG. 5 illustrates a plot of land 42 upon which are located structures 44 and 46, as well as sign 48. Housing 50 is disposed at a convenient location on land 42. Lines 52 are shown in illuminated form displaying a color harmonious with or contrasting to the light appearing entering housing 50 shown by arrows 20. Lines 54, 56, and 58 illustrate the locations on structure 44 upon which a visual display is made, in varying intensity and varying colors, in accordance with a predetermined pattern responsive to the intensity and color of the light rays shown by arrows 20. Sign 48, similarly, is adapted to display lighting, or colors, responsive to light rays shown by arrows 20, at lines 60. Dotted lines 62 demonstrate the area in which furniture elements 64 and 64a are located. Furniture elements 64 and 64a may be located within structure 44 or 46 or at some remote location. Lines 66 and 68 illustrate the lighting patterns produced responsive to ambient light shown by arrows 20.

Figure 6:
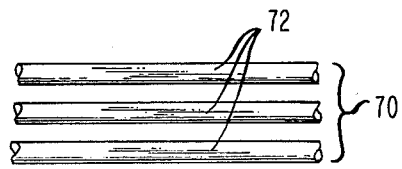
FIG. 6 is a side elevation view of a portion of a plurality of display elements of the present invention.

FIG. 6 is a side elevation view of the plurality of display elements 70, each shown comprising transparent elongated tubes 72. Tubes 72 need not be straight as shown, but may be disposed occupying curving linear paths, not shown, or may be disposed in spaced apart arrangements by joining them tip to tip similar to lines 22a, 24a, 26, 32, 34a, 34b, 34c, 40, 40a, 40b, 52, 54, 56, 58, 60, 66, 68, shown in FIGS. 2, 3, 4, and 5 respectively.

Figure 7:
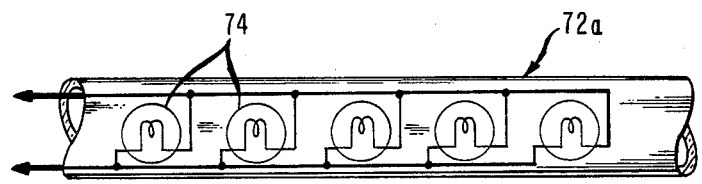
FIG. 7 is a side elevation cross-sectional view of one of the plurality of elements described in FIG. 6, showing the location of individually lighted elements therein.

FIG. 7 illustrates tube 72a lighting elements 74 as shown distributed along the interior of tube 72a and are visually accessible from the exterior of tube 72a. Lighting elements 74 are electrically interconnected as shown, and are provided power from a power source, not shown. Tube 72a may, if desired, be transparent in nature, whilst lighting element 74 may emit light of a given color. Alternatively, tube 72a may be translucent, transmitting only light of a given color and intensity dependent upon the energization level of lighting elements 74.

Figure 8:
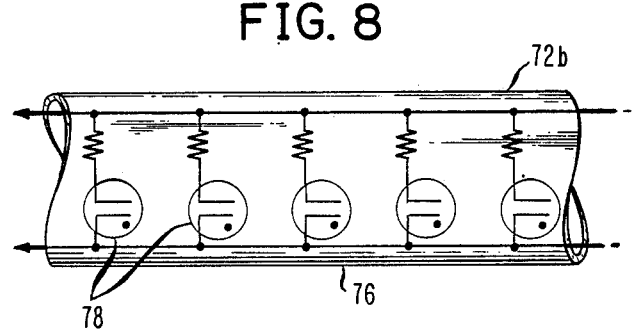
FIG. 8 is another side elevation cross-sectional view of an alternate embodiment of FIG. 7.

FIG. 8 illustrates another elongated tube 72b, comprising a transparent or translucent elongated housing 76 containing glow discharge lighting elements 78, such as neon glow discharge tubes. Glow discharge tubes 78 are shown in a parallel electrical circuit and are powered from a source, not shown, intended to provide ionizing power to such elements responsive to the color and intensity of ambient light. As in FIG. 7, the apparatus shown in FIG. 8 may be transparent or translucent in a given color or, alternatively, each of the glow discharge tubes may be individually colored so as to emit variable colored lights at variable intensities responsive to energizing power not shown.

Figure 9:
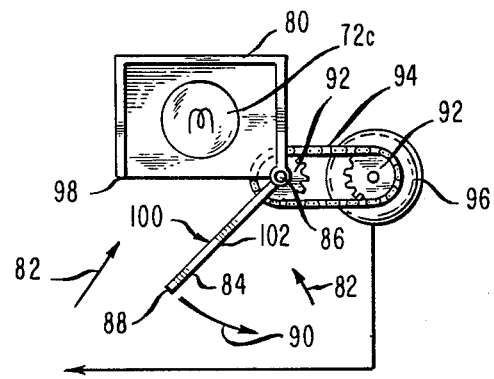
FIG. 9 is a cross-sectional view of an embodiment of a light-emitting, shutter controlled lighting display.

FIG. 9 illustrates a housing 80 containing therewithin a lightable or simply visually accessible element 72c. Housing 80 is visually accessible in the direction of arrows 82 when door 84 is opened by pivoting around pivot line 86, having end 88 thereof move in the direction of arrow 90. Gears 92 are shown coupled together for simultaneous rotation by drive chain 94. Motor 96, when energized, controls the positional relationship of door 84. When end 88 of the door engages point 98 of housing 80, tube 72c is not visually accessible. When door 84 is pivoted such that end 88 is furthestmost from end 98 of housing 80, tube 72c is completely visually accessible and surface 100 of door 84 is exposed to view. Door surface 100 may comprise a fixed color the same as, or contrasting, to the color disposed on surface 102.

Figure 10:
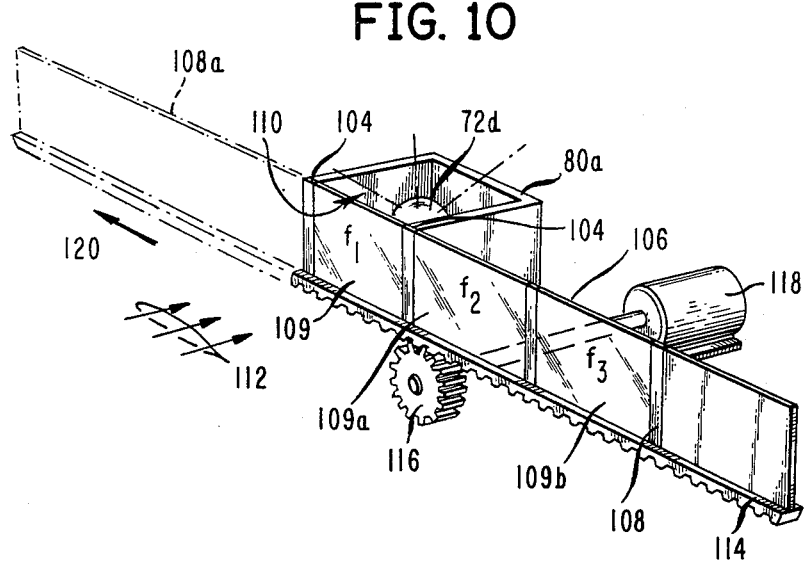
FIG. 10 is a cross-sectional view of an alternate form of light-emitting chromatic display.

FIG. 10 illustrates a housing 80a containing therewithin lighting element 72d. Lighting element 72d is capable of emitting light responsive to the ambient light in color and intensity. Disposed adjacent to ends 104 of housing 80a is a filter slide mechanism 106 comprising frame 108. Such filter slide contains three filter elements 109, 109a, and 109b, disposed in side-by-side relationship, and having an area and shape consistent with the open-mouth portion 110 of housing 80a. In the position shown, tube 72d is visually accessible from the direction of arrows 112, only by filtering effect of filter 109 thereinbetween. Rack 114 is disposed along the bottom edge of frame 108. Gear 116, coupled to motor 118, when rotated, causes the positional relationship of frame 108 to shift to the left, shown in the direction of arrow 120, so as to positon frame 108 in the position shown by dotted lines 108a. Thus, a single lighting element, 72d, can be utilized to provide light of varying colors, dependent upon the location of frame 108. Thus, lighting source 72d can be of a fixed color, with filter element 109 being transparent, and, when filter element 109a is positioned over open-mouth portion 110, and lighting element 72d is energized in varying intensity, another color light is visually accessible in direction of arrows 112, other than the light available when lighting element 72d is energized and filter element 109 is positioned over open-mouth portion 110. Motor 118 is operated responsive to the color of the ambient light.

Figure 11:
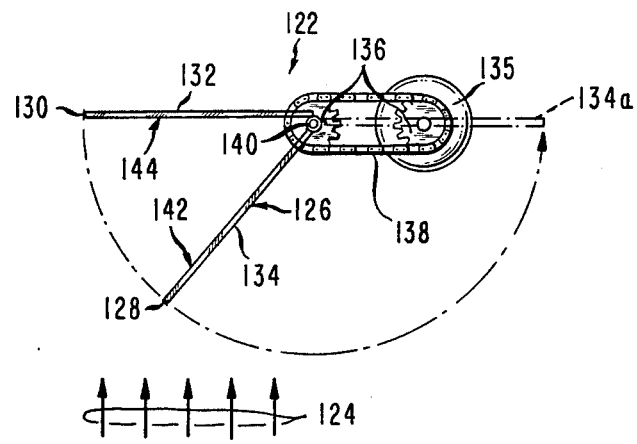
FIG. 11 is a cross-sectional view of a monochromatic motor operated embodiment or the present invention.

FIG. 11 illustrates static display 122, which display is visually accessed from the direction of arrows 124. When shutter panel 134 has end 128 thereof adjacent to end 130 of stationary panel 132, surface 126 presents a given color to individuals sighting same in the direction of arrows 124. When motor 135 is energized, gears 136, coupled together by chain 138, cause panel 134 to pivot around pivot line 140. When this occurs, panel 134 can move to a fully open position as shown by dotted lines 134a. In such position, surface 142 becomes visually accessible, as well as surface 144 of stationary panel 132. No operating power need be provided structure 122 during times that motor 135 is not operated. Thus, as many as three different colors may be displayed at various times, dependent upon the position of panel 134.

Figure 12:
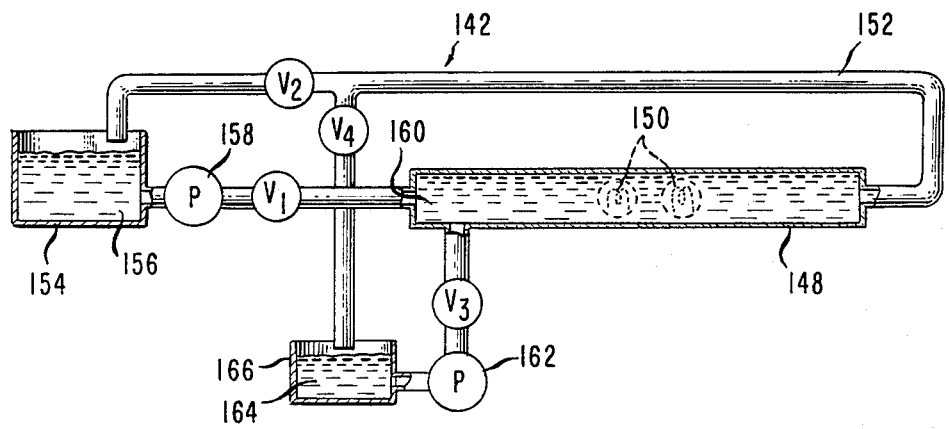
FIG. 12 is a diagram representing a fluid coupling system comprising a piping system of the present invention having multicolored areas of accessible visualization.

FIG. 12 illustrates apparatus 146, comprising an elongated visually accessible tube 148. Tube 148 is hollow in nature and may, as desired, be illuminated by lighting elements shown by dotted lines 150. Lighting elements 150 may be disposed within the confines of tube 148 or may be disposed behind tube 148 for access by a visual user. Tube 152 need not be transparent or translucent in nature and is simply fluidly coupled to tube 148 at a convenient location. Reservoir 154 contains fluid 156. Pump 158, when energized, causes fluid 156 to be pumped therethrough and enter end 160 of tube 148, entirely filling same. Fluid 156 may be of a given color so as to present a pleasing color to the user. When valves V1 and V2 are opened, fluid 156 passes through tubes 148 and 152 and is reintroduced back into reservoir 154. Should the display indicate a static color, valve V2 is closed, by means not shown, after tube 148 is filled with liquid 156. At any selected time, responsive to the ambient lighting conditions in the area of the visual user, valve V1 may be selectively closed, valve V3 selectively opened, such that pump 162 is energized. When this occurs, liquid 164, disposed within reservoir 166, but having a different color from liquid 156, is caused to enter end 160 of tube 148. Should this occur, visual user will visually access the color of liquid 164. Valve V4 is used to control the times at which liquid 164 is disposed within tube 148 or to be returned to reservoir 166. The intensity of lighting element 150 may be varied in accordance with a responsive pattern or algorithm, responsive to the ambient lighting conditions surrounding the visual user.

Figure 13:
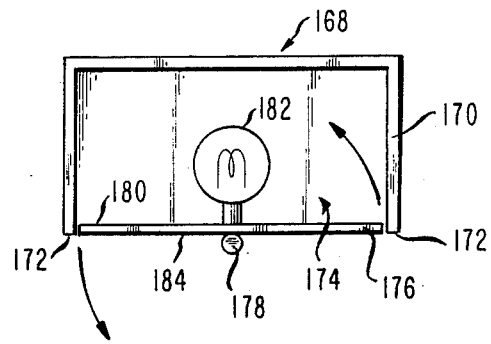
FIG. 13 is an end view of another embodiment of the present invention.

FIG. 13 illustrates a display element 168 comprising housing 170, having edges 172 defining open-mouth portion 174. Plate 176 is mounted on a pivot bar 178 which may pivot along its elongated longitudinal axis. Mounted to surface 180 of plate 176 is elongated lighting element 182. Surfaces 180 and 184 of plate 176 may be variently colored. Elongated lighting element 182 may be energized so as to produce light in varying colors and in varying intensities in accordance with the present teaching. Plate 176 may be pivoted around pivot bar 178, utilizing a motor, not shown. Thus, when plate 176 is in the position shown, surface 184 is visually accessible. When plate 176 is rotated 180 degrees from the position shown, then surface 180 is similarly visually accessible, surface 184 being concealed from view. In this position, elongated lighting element 182 is similarly visually accessible and may be selectively energized in varying colors and intensities to contrast and harmonize with the color disposed on surface 180.

Figure 14:
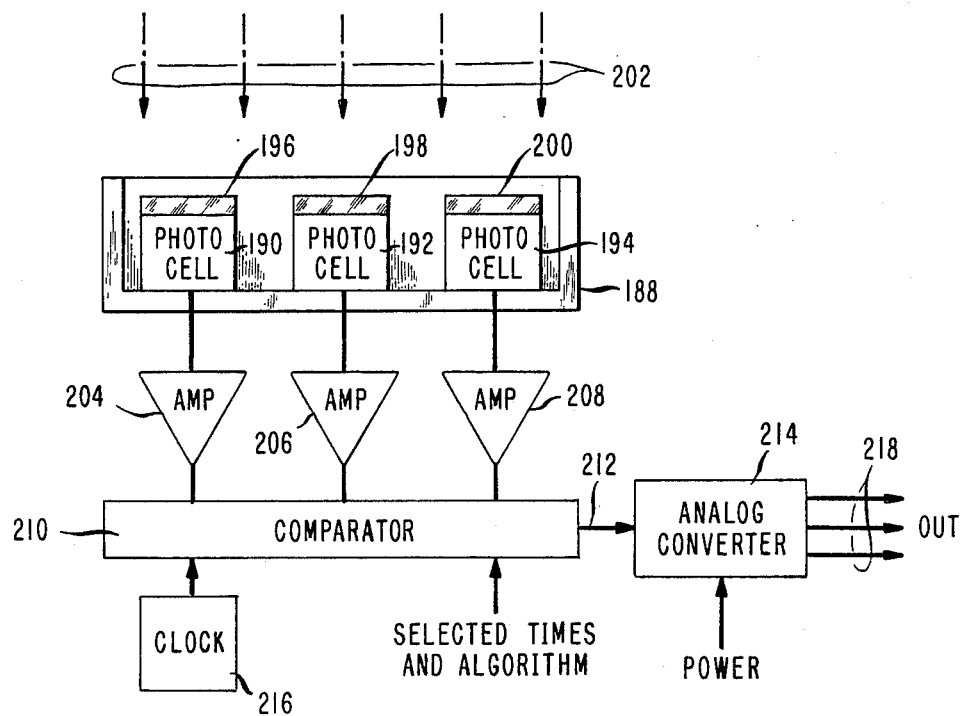
FIG. 14 is a block diagram representing the electrical control mechanism of the present invention.

FIG. 14 illustrates housing 188, which is similar in function to housing 16, shown in FIG. 1 and 2, housing 38 shown in FIG. 4, and housing 50 shown in FIG. 5. Contained within housing 188 are photocells 190, 192, and 194. Filters 196, 198, and 200 are positioned so as to be located intermediate incoming light rays 202 and the active portions of photocells 190, 192, and 194. Thus, photocell 190 will only receive operating light responsive to the color of filter 200. In similar fashion, photocell 192 will receive light responsive to the color of filter 198 and photocell 194 will receive light responsive to the color of filter 200. By selelcting filters 196, 198, and 200 to be primary colors, a complete analytical evaluation can be made of the color of light rays 202. Amplifiers 204, 206, and 208 are electrically coupled to photocells 190, 192, and 194 respectively. Amplifiers 204, 206, and 208 are in turn electrically coupled to comparator 210. Comparator 210, in a manner well known to the art, is pre-programmed with an algorithm that utilizes the signals produced by amplifiers 204, 206, and 208, compares them with a predetermined, manually adjustable, if desired, color and intensity program so as to produce, at selected times, digital signals passing along wire 212 feeding digital to analog converter 214, responsive to the color and intensity of light rays 202. Clock 216 is used to provide timing signals to comparator 210 and is similarly programmed to permit signals to pass to digital to analog converter 214 at predetermined times. The output of digital to analog converter 214, symbolized by arrows 218, is in turn fed to the visual lighting displays, motors, and other variable elements of the lighting displays taught in the prior figures.

In accordance with the various embodiments of the present invention described herein, optical displays, both passive and active in nature, are presented to visual users so as to be responsive to the ambient light, light's intensity and color, in accordance with a preset, predetermined but variable group of color combinations and timing program.

For example, and not in limitation, should the ambient colors appear to be grey or white, the coloring of the visual displays accessible to users could be yellow. When the ambient light is blue, the visual accessible color could then be red. When the ambient light is yellow, the visual accessible color could be orange. In addition, when the ambient light is mauve, the visual accessible color may be blue. Obviously, when the ambient light is nonexistant or extremely dark, the visual displays may be inactive. Or, to the contrary, the lighting displays may be turned on with diminished intensity. It is readily apparent that the flexibility of the present teaching is limited only by the imagination of the algorithm employed, the number of lighting elements and their locations. Other forms, not shown, of displays may be utilized. The displays may produce light, reflect light, or do both. The displays may have two states of appearance, or an infinite range of states of appearance. The lighting individual lighting elements of any portion of the display may be all of the same color or may be of alternate colors or may vary in intensity for each color.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

1. A chromatic lighting display comprising at least one of a plurality of housings, said at least one housing having an exterior portion and an interior portion, at least one opening, said at least one opening communicating between said exterior portion and said interior portion of said at least one housing, means to detect the primary colors of ambient light present at said exterior portion of said at least one housing, means to detent the intensity of each of said primary colors present at said exterior portion of said at least one housing, at least three photocells, each of said at least three photocells producing output signals, said at least three photocells being secured to said interior portion of said at least one housing and exposed to said ambient light light entering said at least one housing through said at least one opening, at least three differently colored filters, said at least three colored filters being positioned to filter said ambient light passing through said at least one opening and through each of said at least three colored filters and impinging upon each of said at least three photocells, at least three amplifiers, each of said at least three photocells having output terminals, each of said at least three amplifiers having input terminals, each of said amplifier input terminals connected independently to each of said photocell output terminals, a comparator, said comparator having output terminals, means whereby said comparator produces output signals at said comparator output terminals, each of said at least three amplifiers having output terminals, means whereby each of said at least three amplifiers amplifies each of said at least three photocell output signals, means whereby said output terminals of each of said at least three amplifiers are coupled to said comparator, an algorithm of programmed preselected adjustable time intervals and programmed preselected adjustable color patterns of programmed varying color intensities and programmed varying durations being programmed into said comparator, at least one lighting display, said at least one lighting display having means to produce light signals, means whereby said comparator output terminals are coupled to said at least one lighting display whereby said light signals produced by said at least one lighting display will be energized and controlled by said output signals produced by said comparator output terminals for said preselected adjustable time intervals and said preselected adjustable color patterns of said varying color intensities and said varying durations responsive to said algorithm by said output signals produced by said comparator output terminals and responsive to the output signals produced by said at least three amplifiers.

2. The apparatus as claimed in claim 1 wherein said at least one housing is secured to said at least one lighting display and positioned to have said at least one opening of said at least one housing disposed to receive and only pass said ambient light therethrough exclusive of said light signals produced by said at least one lighting display.

3. The apparatus as claimed in claim 1 wherein said at least one lighting display is mounted outdoors.

4. The apparatus as claimed in claim 1 wherein said at least one lighting display is contained within the interior of a building and wherein said at least one opening of said at least one housing is exposed to the exterior of said building.

5. The apparatus as claimed in claim 1 wherein said at least one opening of said at least one housing and said at least one lighting display are confined within the interior of a building.

6. The apparatus as claimed in claim 5 wherein said at least one housing and said at least one lighting display are disposed at separate locations within said interior of said building.

7. The apparatus as claimed in claim 5 wherein said at least one lighting display is secured to articles of furniture.

8. The apparatus as claimed in claim 5 wherein said at least one lighting display is secured to at least one edge of a window of said building.

9. The apparatus as claimed in claim 3 further comprising said at least one lighting display having exterior edges and having other surface portions at various locations along the surface of said at least one lighting display, means whereby said exterior edges and said other surface portions each display different light signals produced by said at least one lighting display to be visually accessible to a user.

10. The apparatus as claimed in claim 1 whereby said at least one lighting display comprises at least one string of a plurality of strings of electrical light producing elements, said at least one string of electrical light producing elements being disposed in an elongated path and means whereby said at least one string is operated and controlled by said output signals produced by said comparator output terminals.

11. The apparatus as claimed in claim 1 further comprising said at least one lighting display having a moveable shutter, means to variably position said moveable shutter over said at least one lighting display exposing selected amounts of said light signals produced by said at least one lighting display to be visually accessible to a user.

12. The apparatus as claimed in claim 1 wherein said at least one lighting display comprises at least one electrically operated lighting element, a track, a plurality of colored filters each sequentially affixed adjacent one another, means whereby said plurality of colored filters are moveable along said track, means whereby said plurality of colored filters are positioned at selected locations over the length of said at least one electrically operated lighting element in selected positions operated and controlled by said output signals produced by said comparator output terminals.

* * * * *